United States Patent
Sato et al.

(10) Patent No.: US 11,273,511 B2
(45) Date of Patent: Mar. 15, 2022

(54) METHOD AND SYSTEM FOR MANUFACTURING LAMINATED SHAPED PRODUCT

(71) Applicant: KOBE STEEL, LTD., Hyogo (JP)

(72) Inventors: Shinji Sato, Hyogo (JP); Takeshi Yamada, Hyogo (JP); Takemasa Yamasaki, Hyogo (JP); Keisuke Okita, Hyogo (JP)

(73) Assignee: Kobe Steel, Ltd., Hyogo (JP)

( * ) Notice: Subject to any disclaimer, the term of this patent is extended or adjusted under 35 U.S.C. 154(b) by 337 days.

(21) Appl. No.: 16/495,755

(22) PCT Filed: Feb. 27, 2018

(86) PCT No.: PCT/JP2018/007375
§ 371 (c)(1),
(2) Date: Sep. 19, 2019

(87) PCT Pub. No.: WO2018/180135
PCT Pub. Date: Oct. 4, 2018

(65) Prior Publication Data
US 2020/0038983 A1    Feb. 6, 2020

(30) Foreign Application Priority Data

Mar. 27, 2017  (JP) .............................. JP2017-061063

(51) Int. Cl.
*B33Y 30/00* (2015.01)
*B33Y 10/00* (2015.01)
(Continued)

(52) U.S. Cl.
CPC ................ *B23K 9/04* (2013.01); *B33Y 10/00* (2014.12); *B33Y 50/02* (2014.12)

(58) Field of Classification Search
CPC ...... B23K 9/04–048; B23K 26/34–342; B33Y 10/00; B33Y 30/00
See application file for complete search history.

(56) References Cited

U.S. PATENT DOCUMENTS

2012/0193335 A1   8/2012   Guldberg
2014/0110872 A1   4/2014   Levy et al.
(Continued)

FOREIGN PATENT DOCUMENTS

CN    102941394 B    4/2015
CN    104690404 A    6/2015
(Continued)

OTHER PUBLICATIONS

The extended European search report issued by the European Patent Office dated Jul. 10, 2020, which corresponds to European Patent Application No. 18777928.5.
(Continued)

*Primary Examiner* — Michael A Laflame, Jr.
(74) *Attorney, Agent, or Firm* — Studebaker & Brackett PC

(57) ABSTRACT

A method for producing an additively manufactured object includes melting and solidifying a filler metal by use of an arc, and depositing and forming a plurality of layers of molten beads to produce a built-up object, and the method includes: shaping the molten bead of a previous layer; and monitoring a temperature of the molten bead of the previous layer. Shaping of the molten bead of a next layer is started when the temperature of the molten bead of the previous layer is equal to or lower than an allowable interpass temperature.

11 Claims, 6 Drawing Sheets

(51) Int. Cl.
*B23K 26/34* (2014.01)
*B23K 9/04* (2006.01)
*B33Y 50/02* (2015.01)

(56) References Cited

U.S. PATENT DOCUMENTS

2016/0107261 A1    4/2016  Guldberg
2017/0320277 A1*  11/2017  Wang ..................... B28B 1/001
2019/0054683 A1    2/2019  Levy et al.
2019/0061061 A1*   2/2019  Fischer .................. B22F 10/20

FOREIGN PATENT DOCUMENTS

| CN | 105171186 A | 12/2015 |
| CN | 105921851 A | 9/2016 |
| JP | 3784539 B2 | 6/2006 |
| JP | 2013-501627 A | 1/2013 |
| JP | 2014-503385 A | 2/2014 |
| JP | 2016-022480 A | 2/2016 |

OTHER PUBLICATIONS

Haibin Geng et al: "Optimisation of interpass temperature and heat input for wire and arc additive manufacturing 5A06 aluminium alloy", Science and Technology of Welding and Joining, vol. 22, No. 6, Nov. 23, 2016 (Nov. 23, 2016), pp. 472-483.
International Search Report issued in PCT/JP2018/007375; dated May 22, 2018.
Written Opinion issued in PCT/JP2018/007375; dated May 22, 2018.

* cited by examiner

METHOD AND SYSTEM FOR MANUFACTURING LAMINATED SHAPED PRODUCT

TECHNICAL FIELD

The present invention relates to a production method and production system for an additively manufactured object. More specifically, the present invention relates to a production method and production system for an additively manufactured object, in which a filler metal is melted and solidified using an arc to perform additive manufacturing.

BACKGROUND

In recent years, there is a growing need for a 3D printer as production means, and particularly regarding application to a metal material, researches and developments toward practical application are made in aircraft industry, etc. A 3D printer using a metal material is configured to shape a built-up object by melting a metal powder or a metal wire by use of a heat source such as a laser or an arc, and depositing the molten metal.

Conventionally, as a technique for shaping a built-up object by depositing a molten metal, a technique of producing a metal mold by using a weld bead is known (see, for example, Patent Literature 1). Patent Literature 1 describes a method for producing a metal mold, including generating profile data representing the profile of a metal mold, dividing a metal mold into multilayers along contour lines based on the generated profile data, and creating a travel path of a welding torch for supplying a filler metal based on the obtained profile data of multilayers.

In addition, conventionally, as a method for joining pipes to each other by welding, a multilayer welding method as follows is known: in order to enhance the welding efficiency, a welding torch ceasing to generate an arc is moved to a position corresponding to the shortest distance not exceeding the limit of interpass temperature with respect to a weld bead formed in the weld pass of a previous layer and welds a next layer see, for example, Patent Literature 2).

CITATION LIST

Patent Literature

Patent Literature 1: Japanese Patent No. 3784539
Patent Literature 2: JP-A-2016-22480

SUMMARY OF INVENTION

Technical Problem

Meanwhile, in the additive manufacturing method using an arc, the heat input amount is large compared with a laser and the deposition efficiency (buildup amount per unit time) is high, and as a result, the cooling rate is low. As illustrated in FIG. 6A, when an additively manufactured object 100 is formed by depositing N layers of weld bead 102 by use of a welding torch 101, if the temperature of the weld bead 103 of the (N−1)-th layer remains high in depositing a weld bead 104 of the N-th layer, a problem such as flattening (see FIG. 6B) or running down (see FIG. 6C) of the bead 104 of the N-th layer occurs, so that the deposition is made unstable. On the other hand, if the deposition time is prolonged, the problem of flattening or running down of the bead 104 is not caused, but there is a problem of reducing the deposition productivity, and the deposition time per layer needs to be shortened so as to enhance the productivity.

In the production method of Patent Literature 1, the above-described problems are not taken into consideration. Patent Literature 2 is not a technique relating to additive manufacturing and since a weld pass of a next layer is performed from a position which is distant by the shortest distance with respect to a weld bead formed in the weld pass of a previous layer as long as the limit of interpass temperature is not exceeded, the technique cannot deal with additive manufacturing that is performed by aligning the end part positions to each other.

The present invention has been made in consideration of those problems, and an object of the present invention is to provide a production method and production system for an additively manufactured object, each of which enables stable deposition while ensuring deposition precision.

Solution to Problem

The object of the present invention can be achieved by the following configurations.

(1) A method for producing an additively manufactured object, including melting and solidifying a filler metal by use of an arc, and depositing and forming a plurality of layers of molten beads to produce a built-up object, the method including:
 depositing the molten bead of a previous layer, and
 monitoring a temperature of the molten bead of the previous layer,
 in which deposition of the molten bead of a next layer is started when the temperature of the molten bead of the previous layer is equal to or lower than an allowable interpass temperature.
(2) The method for producing an additively manufactured object according to (1), further including measuring a cooling time until the temperature of the molten bead of the previous layer is cooled down to the allowable interpass temperature from a temperature at a start of deposition,
 in which a deposition time of the molten bead per layer is set to be not less than the cooling time.
(3) The method for producing an additively manufactured object according to (2), in which the deposition time of the molten bead per layer is set to be the cooling time.
(4) A method for producing an additively manufactured object, including melting and solidifying a filler metal by use of an arc, and depositing and forming a plurality of layers of molten heads to produce a built-up object, the method including:
 depositing the molten bead,
 monitoring a temperature of the molten bead, and
 measuring a cooling time until the temperature of the molten bead is cooled down to an allowable interpass temperature from a temperature at a start of deposition,
 in which the number of welding torches in depositing the molten bead is set to an integer value of a quotient obtained by dividing a deposition time of the molten bead per layer by the cooling time.
(5) The method for producing an additively manufactured object according to any one of (2) to (4),
 in which the deposition time of the molten bead per layer is adjusted by changing at least one of current, voltage and welding speed during the depositing while a heat input amount per unit length of the molten bead during the depositing is kept constant.

(6) The method for producing an additively manufactured object according to any one of (2) to (4),
in which the deposition time of the molten bead per layer is adjusted by changing at least one of current, voltage and welding speed during the depositing so that a cross-sectional area of the molten bead during the depositing is kept constant.
(7) A system for producing an additively manufactured object, including depositing and forming a plurality of layers of molten beads to produce a built-up object, the system including:
a deposition device configured to melt and solidify a filler metal by use of an arc based on layer profile data representing a profile of each layer obtained by dividing the built-up object into a plurality of mutually parallel layers, and deposit and form a plurality of layers of the molten bead,
a temperature sensor configured to measure a temperature of the molten bead every time the molten bead is formed, and
a control device configured to control the deposition device so that deposition of the molten bead of a next layer is started when a temperature of the molten bead of a previous layer is equal to or lower than an allowable interpass temperature.

Advantageous Effects of Invention

According to the production method and production system for an additively manufactured object of the present invention, a molten bead of a previous layer is deposited, and the temperature of the molten bead of the previous layer is monitored by a temperature sensor. Deposition of the molten bead of a next layer is started when the temperature of the molten bead of the previous layer falls to be equal to or lower than the allowable interpass temperature. According to this configuration, stable additive manufacturing by an arc can be achieved while ensuring deposition precision.

In addition, according to the production method for an additively manufactured object of the present invention, a molten bead is deposited, the temperature of the molten bead is monitored by a temperature sensor, and furthermore, the cooling time until the temperature of the molten bead is cooled down to the allowable interpass temperature from the temperature at the start of deposition. Then, the number of welding torches in depositing the molten bead is set to an integer value of the quotient obtained by dividing the deposition time of the molten bead per layer by the cooling time. According to this configuration, an additively manufactured object can be shaped with good efficiency.

DESCRIPTION OF EMBODIMENTS

The production method and production system for an additively manufactured object according to each embodiment of the present invention are described in detail below based on drawings. The following embodiments are examples embodying the present invention and are not intended to limit the technical scope of the present invention.

First Embodiment

Figure 1:
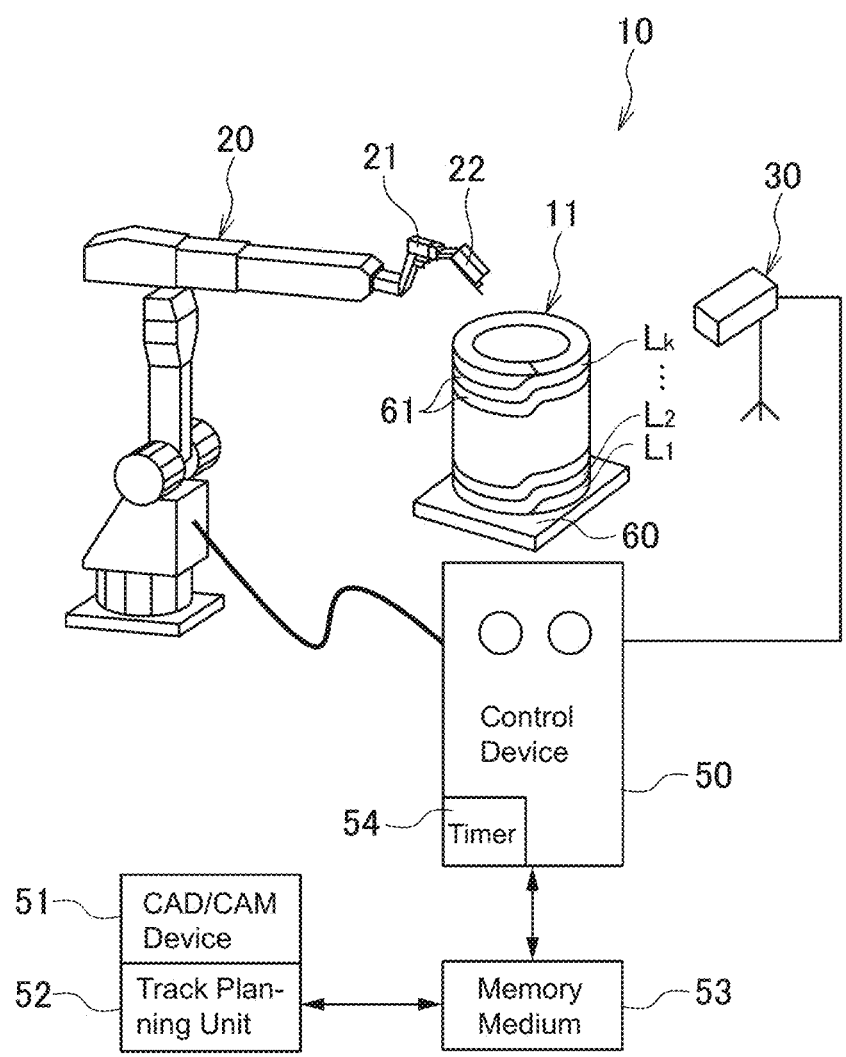
FIG. 1 is a schematic view of the configuration of the production system for an additively manufactured object according to a first embodiment of the present invention.

As illustrated, in FIG. 1, the production system 10 for an additively manufactured object of this embodiment includes a welding robot 20, a temperature sensor 30, a control device 50, a CAD/CAM device 51, a track planning unit 52, and a memory 53. That is, in this embodiment, an existing welding robot 20 is used as the deposition device.

Figure 2:
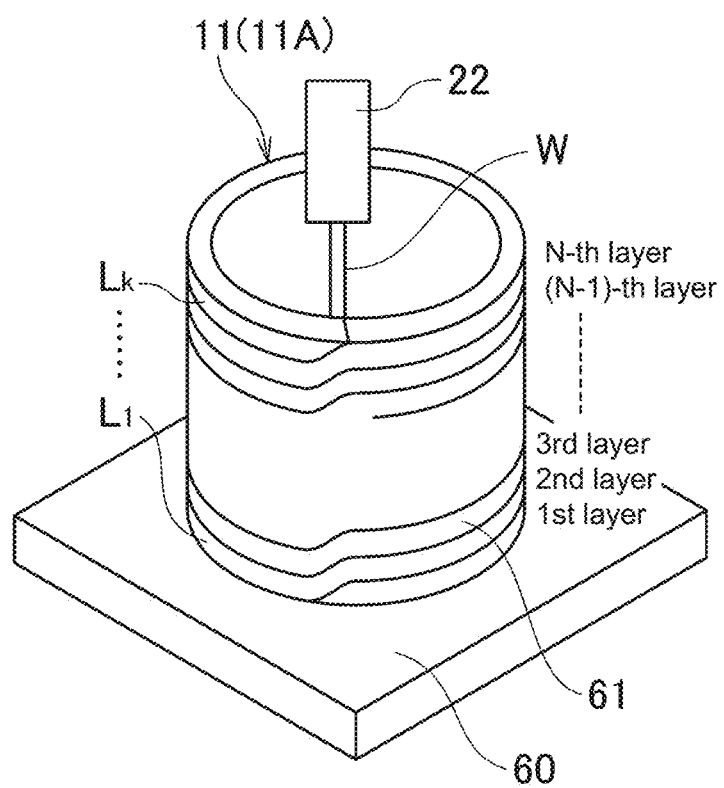
FIG. 2 is a perspective view of a cylindrical additively-manufactured object produced by the production system for an additively manufactured object illustrated in FIG. 1.

Referring also to FIG. 2, in the production system 10 for an additively manufactured object, a welding torch 22 is moved based on the layer profile data representing the profile of each of layers L1 . . . Lk of an additively manufactured object 11 while melting a filler metal (wire) W by the welding robot 20, and a molten bead 61 is deposited over a plurality of layers L1 . . . Lk to shape the additively manufactured object 11.

The additively manufactured object 11 illustrated in FIG. 1 and FIG. 2 is an example in which the molten bead 61 is continuously and spirally deposited (that is, the end of the molten bead 61 of a previous layer is continuous to the start of the molten bead 61 of a next layer) and is thereby molded into a substantially cylindrical shape, but the additively manufactured object 11 can be set to any shape.

The welding robot 20 is an articulated robot and includes the welding torch 22 at the tip of a leading arm 21. The leading arm 21 is three-dimensionally movable, and the welding torch 22 can move to any position in any posture by controlling the posture and position of the leading arm 21 by the control device 50.

The welding torch 22 includes a substantially tubular shield nozzle to which a shielding gas is supplied, a contact tip (not shown) disposed inside the shield nozzle, and a filler metal W held in the contact tip and supplied with a melting current. The welding torch 22 generates an arc to melt and solidify the filler metal W while feeding the filler metal W and flowing a shielding gas, and the molten bead 61 is deposited on a substrate 60 to form the additively manufactured object 11. The welding torch 22 may employ a non-consumable electrode with which a filter metal is supplied from the outside.

The temperature sensor 30 measures the temperature of the molten bead 61 deposited just before, and a contact measurement sensor may be used, but since the deposited molten bead 61 is at a high temperature, a non-contact measurement sensor such as thermoviewer or infrared temperature sensor is preferred.

In this embodiment, the temperature sensor 30 measures the temperature at the deposition start position of each layer.

The control device 50 controls the welding robot 20 and the temperature sensor 30 to deposit a plurality of molten beads 61, thereby shaping the additively manufactured object 11.

The CAD/CAM device 51 creates profile data of the additively manufactured object 11 to be formed and then produces layer profile data representing the profile of each of the layers L1 ... Lk by dividing the object into a plurality of layers (see FIG. 2). The track planning unit 52 produces a movement track for the welding torch 22 based on the layer profile data. The memory 53 stores the produced layer profile data, the movement track for the welding torch 22, the interpass temperature Tp, etc.

The control device 50 controls the movement of the welding robot 20 based on, for example, the layer profile data, the movement track for the welding torch 22, and the interpass temperature Tp, which are stored in the memory 53, as well as the temperature of the molten bead 61 deposited just before, which is measured by the temperature sensor 30. In addition, the control device 50 has a built-in timer 54 for measuring the cooling time tc until the temperature of the molten bead 61 of each layer is cooled down to the allowable interpass temperature Tp from the temperature at the start of shaping.

The procedure for shaping the additively manufactured object 11 by the production system 10 for an additively manufactured object of this embodiment is described in detail below by referring to FIG. 2 and FIG. 3. Here, the description is made by taking, as an example, a case of shaping a substantially cylindrical additively-manufactured object 11 by depositing the molten bead 61 in the vertical direction.

First, profile data representing the profile of the additively manufactured object 11 is created by the CAD/CAM device 51, and the input profile data. (CAD data) is divided into a plurality of layers L1 ... Lk to produce layer profile data representing the profile of each of the layers L1 ... Lk. The layer profile data representing the profile of each of the layers L1 ... Lk serves as the movement track of the welding torch 22, i.e., the deposition track of the weld bead 61.

Division of the profile data of the additively manufactured object 11 into a plurality of layers is preferably division in the direction substantially orthogonal to the deposition direction of the molten bead 61. More specifically, in the case of forming the additively manufactured object 11 by depositing the molten bead 61 in the vertical direction, the data is divided in the horizontal direction, and in the case of forming the additively manufactured object 11 by depositing the molten bead 61 in the horizontal direction, the data is divided in the vertical direction.

Subsequently, the track planning unit 52 creates a specific deposition plan for the molten bead 61, such as movement track for the welding torch 22 in each of the layers L1 ... Lk and planned height of the molten bead 61 when the molten bead 61 of each of the layers L1 ... Lk is deposited.

As illustrated in FIG. 2, the welding robot 20 moves the welding torch 22 along the planned movement track to deposit the molten bead 61 of a previous layer (for example, first layer L1) on the substrate 60, and the temperature sensor 30 then measures the temperature of the molten bead 61 deposited. Thereafter, the cooling time tc until the temperature of the molten bead 61 at the measurement position (for example, at the start of deposition) is cooled down to the allowable interpass temperature Tp from the temperature at the start of deposition is determined.

Deposition of the molten bead 61 of a next layer (second layer) is started when the temperature of the molten bead 61 of the previous layer (first layer) becomes equal to or lower than the allowable interpass temperature Tp. According to this configuration, the molten bead 61 of the next layer is prevented from flattening, running down, etc. After that, deposition is repeated for all layers up to the layer Lk in the same manner as above while monitoring the temperature of the previous layer, and the good additively manufactured object 11 can thereby be shaped.

Figure 3:
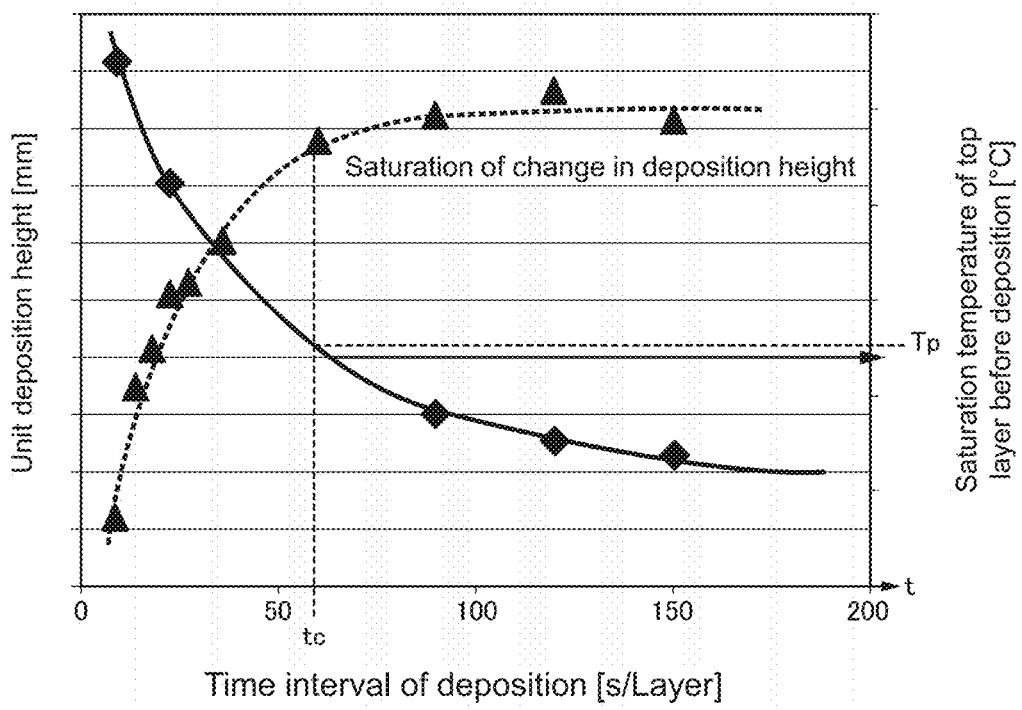
FIG. 3 is a graph illustrating the relationship between the deposition time interval of the molten bead with the unit deposition height and the saturation temperature of the top layer.

FIG. 3 is a graph illustrating an example of the relationship between the deposition time interval until depositing the molten bead of a next layer with the unit deposition height of the molten bead and the saturation temperature of the deposited molten bead. As the deposition time interval is shorter, the unit deposition height of the molten bead is lower. This reveals that when the deposition time interval is short, the temperature of the molten bead 61 is not cooled down to the allowable interpass temperature Tp and flattening, running down, etc. of the molten bead 61 of a next layer occurs. On the other hand, as the deposition time interval is increased, the saturation temperature of the molten bead is lowered.

In Example illustrated in FIG. 3, as indicated by a dashed line in the figure, the deposition time interval t when the change in the unit deposition height is substantially saturated is the cooling time tc. Accordingly, it is understood that the deposition time tf of the molten bead 61 per layer may be set to be equal to or more than the cooling time tc.

In addition, when the deposition time tf of the molten bead 61 per layer is set to the cooling time tc, the molten bead 61 can be continuously deposited in the shortest time without temporarily stopping the arc, and the production efficiency is enhanced.

Setting of the deposition time tf of the molten bead 61 per layer may be adjusted by changing at least one of current, voltage and welding speed during the depositing while a heat input amount per unit length of the molten bead during the depositing is kept constant.

Alternatively, setting of the deposition time tf per layer of the molten bead 61 may be adjusted by changing at least one of current, voltage and welding speed during the depositing so that a cross-sectional area of the molten bead during the depositing is kept constant. According to this configuration, stable deposition can be achieved while maintaining high deposition efficiency and ensuring deposition precision.

As described above, according to the production method and production system for additively manufactured object of this embodiment, a molten bead of a previous layer is deposited, and the temperature of the molten bead 61 of the previous layer is monitored by the temperature sensor 30. Deposition of the molten bead of a next layer is started when the temperature of the molten bead 61 of the previous layer falls to be equal to or lower than the allowable interpass temperature Tp. According to this configuration, stable additive manufacturing by an arc can be achieved while ensuring deposition precision.

More specifically, the cooling time tc, which is the time until the temperature of the molten bead 61 of the previous layer is cooled down to the allowable interpass temperature from the temperature at the start of deposition, is measured, and the deposition time tf of the molten bead 61 per layer should be set to be equal to or more than the cooling time tc.

From the viewpoint of enhancing the production efficiency, it is preferable to set the deposition time tf so that the deposition time tf per layer is equal to or more than the cooling time tc and the difference between the deposition time tf per layer and the cooling time tc is small.

Figure 4:
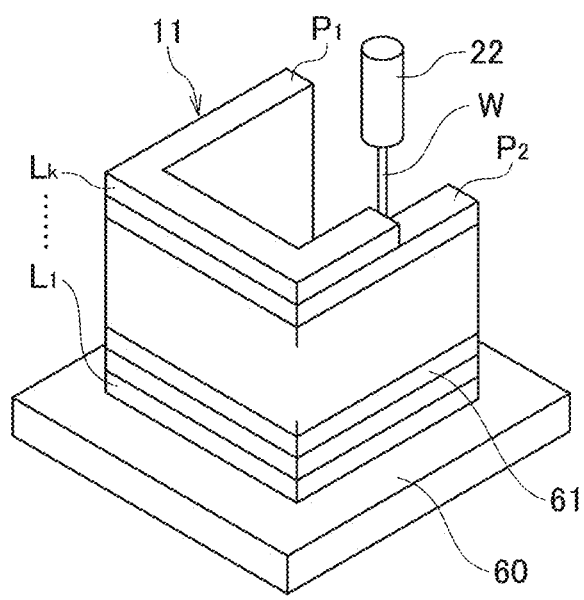
FIG. 4 is a perspective view of a U-shaped additively-manufactured object produced by the production system for an additively manufactured object.

FIG. 4 illustrates a case of forming the additively manufactured object 11 that is a modified example, in which the start position P1 and the end position P2 of the molten beads of respective layers deposited are different. Also in this case, deposition of the molten bead 61 of a next layer is started when the temperature of the molten bead 61 of a previous layer falls to be equal to or lower than the allowable interpass temperature Tp.

In this case, the deposition time tf of the molten bead 61 per layer may be set to be equal to or more than the cooling time tc, but when the total of the deposition time tf of the molten bead 61 per layer and the travel time of the welding torch 22 is set to be not less than the cooling time tc, the production efficiency can be more enhanced.

In a first modified example of this embodiment, after the same built-up model 11A as the additively manufactured object 11 (see, FIG. 2) is previously formed in the same manner as the additively manufactured object 11, the built-up object 11 may be formed by monitoring the temperature of each layer of the built-up model 11A and acquiring the cooling time.

More specifically, in the production method for an additively manufactured object as a first modified example, a filler metal is melted and solidified using an arc, and a plurality of layers of molten beads 61 are deposited and formed to create the same built-up model 11A as the built-up object 11. At this time, the temperature of the molten bead 61 of each layer in the built-up model 11A is monitored. Furthermore, each cooling time until the temperature of the molten bead 61 of each layer in the built-up model 11A is cooled down to the allowable interpass temperature from the temperature at the start of deposition is acquired by measurement or calculation. Deposition of the molten bead 61 of a next layer relative to the molten bead 61 of a previous layer in the built-up object 11 is started when the time from the start of deposition of the molten bead 61 of a previous layer in the built-up model 11A becomes equal to or more than the cooling time of the previous layer. Also by such a production method of the first modified example, additive manufacturing by stable arc can be achieved while ensuring deposition precision.

In addition, when the deposition time tf of the molten bead per layer in the built-up object 11 is, similarly to this embodiment, set to the cooling time, the production efficiency can be enhanced.

The deposition time of the molten bead 61 of each layer in forming the built-up model 11A is set to be longer than the deposition time in forming the built-up object 11 so as to unfailingly prevent the built-up model 11A from becoming unstable.

Furthermore, in a second modified example of this embodiment, the cooling time until the temperature of the molten bead of each layer is cooled down to the allowable interpass temperature from the temperature at the start of deposition may be calculated by simulation analysis.

More specifically, the production method for an additively manufactured object as a second modified example includes a step of analyzing the cooling time until the temperature of the molten bead 61 of each layer is cooled down to the allowable interpass temperature from the temperature at the start of deposition, and deposition of the molten bead 61 of a next layer relative to each layer is started when the time from the start of deposition of the molten bead 61 of each layer becomes equal to or more than the cooling time of each layer.

Second Embodiment

Figure 5:
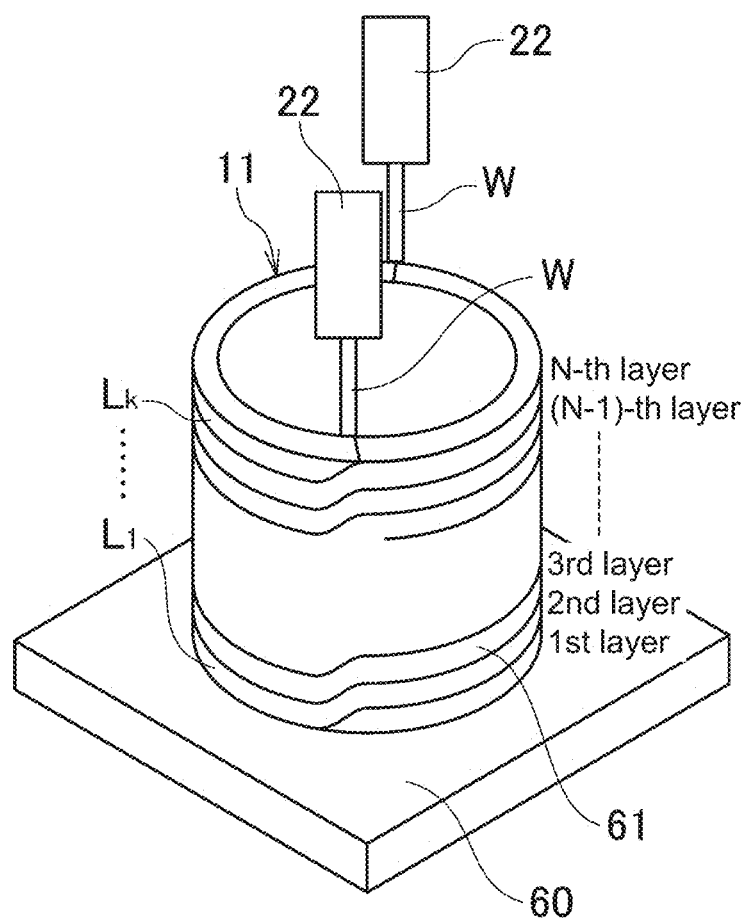
FIG. 5 is a schematic view of the configuration of the production system for an additively manufactured object according to a second embodiment of the present invention.
Figure 6A:
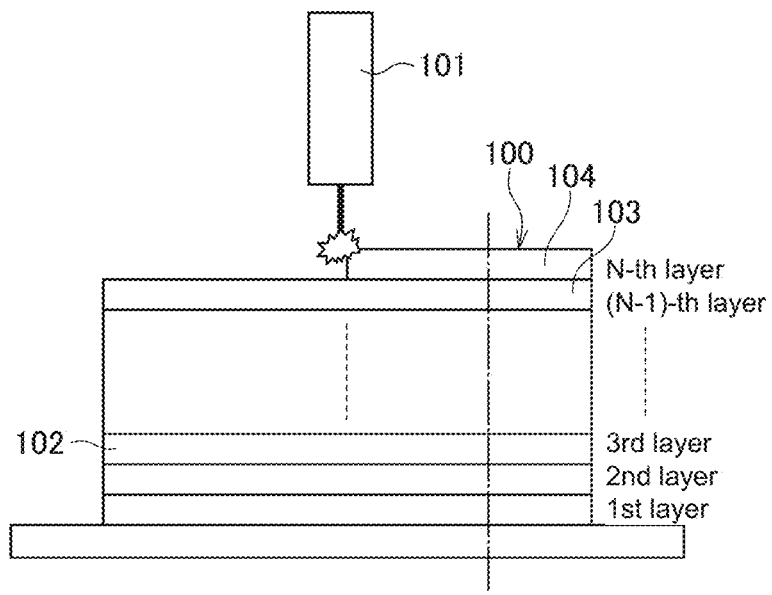
FIG. 6A is a side view illustrating how an additively manufactured object is shaped with a plurality of layers (N layers) of molten beads.
Figure 6B:
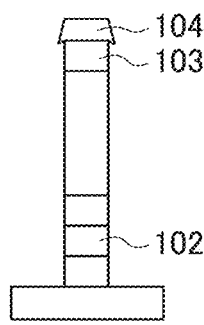
FIG. 6B is a schematic view illustrating a case where a molten bead is flattened due to depositing a molten head while the temperature of the molten bead of a previous layer is high.
Figure 6C:
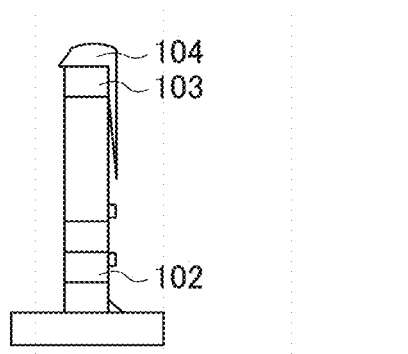
FIG. 6C is a schematic view illustrating a case where running down of a molten bead is caused due to depositing a molten bead while the temperature of the molten bead of a previous layer is high.

The production method and production system for an additively manufactured object according to a second embodiment of the present invention are described in detail below by referring to FIG. 5. The parts which are the same as or equivalent to the first embodiment are denoted by the same numerical references, and their descriptions are omitted or simplified.

In this embodiment, in the case where the deposition time tf of the molten bead 61 per layer to be deposited using one welding torch 22 is very long compared with the cooling time tc, a plurality of molten beads 61 are simultaneously deposited using a plurality of welding torches 22 to enhance the production efficiency.

More specifically, the number of welding torches 22 in depositing the molten bead 61 is set to an integer value of the quotient obtained by dividing the deposition time tf of the molten bead 61 per layer to be deposited using one welding torch 22, by the cooling time tc. For example, as illustrated in FIG. 5, when the integer value of the quotient obtained by dividing the deposition time tf of the molten bead 61 per layer with one welding torch 22 by the cooling time tc is 2, the deposition is performed using two welding torches 22.

In this embodiment, as for the cooling time tc, a cooling time until the molten bead 61 of a previous layer is cooled to the allowable interpass temperature from the temperature at the start of deposition is measured, and the number of welding torches 22 is determined when the molten bead 61 of a next layer is deposited. However, in the case of manufacturing the same built-up object, cooling times until the molten beads 61 of all layers are cooled to the allowable interpass temperature from the temperature at the start of deposition may be measured when a first built-up object is manufactured, the longest cooling time may be set as the cooling time tc, and the number of welding torches 22 in manufacturing second and subsequent built-up objects may be set based on the cooling time tc.

Other configurations and actions are the same as those of the first embodiment.

The present invention is not limited to the above-described embodiments, and modifications, improvements, etc. can be appropriately made therein.

For example, the temperature sensor 30 may be configured to monitor the temperature at the deposition start position of each layer, and in the case where the cooling time until the temperature of the measured molten bead 61 reaches the allowable interpass temperature is predictable in advance, deposition of the molten bead of a next layer may be started based on the predicted cooling time tc.

In addition, the temperature of the molten bead 61 may be monitored at a plurality of sites and in this case, it is preferred that at each monitoring site, the temperature is equal to or lower than the allowable interpass temperature when the molten bead of a next layer is deposited.

This application is based on Japanese Patent Application No. 2017-061063 filed on Mar. 27, 2017, the entire subject matter of which is incorporated herein by reference.

REFERENCE SIGNS LIST

10 Production system for additively manufactured object
11 Additively manufactured object (built-up object)

11A Built-up model
20 Welding robot (deposition device)
30 Temperature sensor
50 Control device
61 Molten bead
L1 . . . Lk Layer
tc Cooling time
tf Deposition time of molten bead per layer
Tp Interpass temperature

The invention claimed is:

1. A method for producing an additively manufactured object, comprising melting and solidifying a filler metal by use of an arc, and depositing and forming a plurality of layers of molten beads to produce a built-up object,
the method comprising:
depositing the molten bead of a previous layer;
monitoring a temperature of the molten bead of the previous layer, wherein deposition of the molten bead of a next layer is started when the temperature of the molten bead of the previous layer is equal to or lower than an allowable interpass temperature, and
measuring a cooling time until the temperature of the molten bead of the previous layer is cooled down to the allowable interpass temperature from a temperature at a start of deposition,
wherein the total of a deposition time of the molten bead per layer and a travel time of a welding torch is set to be not less than the cooling time (tc).

2. The method for producing an additively manufactured object according to claim 1,
wherein a deposition time of the molten bead per layer is set to be not less than the cooling time.

3. The method for producing an additively manufactured object according to claim 2, wherein the deposition time of the molten bead per layer is set to be the cooling time.

4. A method for producing an additively manufactured object, comprising melting and solidifying a filler metal by use of an arc, and depositing and forming a plurality of layers of molten beads to produce a built-up object, the method comprising:
depositing the molten bead;
monitoring a temperature of the molten bead; and
measuring a cooling time until the temperature of the molten bead is cooled down to an allowable interpass temperature from a temperature at a start of deposition,
wherein the number of welding torches in depositing the molten bead is set to an integer value of a quotient obtained by dividing a deposition time of the molten bead per layer by the cooling time.

5. The method for producing an additively manufactured object according to claim 2,
wherein the deposition time of the molten bead per layer is adjusted by changing at least one of current, voltage and welding speed during the depositing while a heat input amount per unit length of the molten bead during the depositing is kept constant.

6. The method for producing an additively manufactured object according to claim 2,
wherein the deposition time of the molten bead per layer is adjusted by changing at least one of current, voltage and welding speed during the depositing so that a cross-sectional area of the molten bead during the depositing is kept constant.

7. A system for producing an additively manufactured object, depositing and forming a plurality of layers of molten beads to produce a built-up object, the system comprising:
a deposition device configured to melt and solidify a filler metal by use of an arc based on layer profile data representing a profile of each layer obtained by dividing the built-up object into a plurality of mutually parallel layers, and deposit and form a plurality of layers of the molten beads;
a temperature sensor configured to measure a temperature of the molten bead every time the molten bead is formed; and
a control device configured to control the deposition device so that deposition of the molten bead of a next layer is started when a temperature of the molten bead of a previous layer is equal to or lower than an allowable interpass temperature, and
configured to measure a cooling time until the temperature of the molten bead of the previous layer is cooled down to the allowable interpass temperature from a temperature at a start of deposition,
wherein the total of a deposition time of the molten bead per layer and a travel time of a welding torch is set to be not less than the cooling time (tc).

8. The method for producing an additively manufactured object according to claim 3,
wherein the deposition time of the molten bead per layer is adjusted by changing at least one of current, voltage and welding speed during the depositing while a heat input amount per unit length of the molten bead during the depositing is kept constant.

9. The method for producing an additively manufactured object according to claim 4,
wherein the deposition time of the molten bead per layer is adjusted by changing at least one of current, voltage and welding speed during the depositing while a heat input amount per unit length of the molten bead during the depositing is kept constant.

10. The method for producing an additively manufactured object according to claim 3,
wherein the deposition time of the molten bead per layer is adjusted by changing at least one of current, voltage and welding speed during the depositing so that a cross-sectional area of the molten bead during the depositing is kept constant.

11. The method for producing an additively manufactured object according to claim 4,
wherein the deposition time of the molten bead per layer is adjusted by changing at least one of current, voltage and welding speed during the depositing so that a cross-sectional area of the molten bead during the depositing is kept constant.

* * * * *